United States Patent
Ko

(10) Patent No.: US 9,950,631 B2
(45) Date of Patent: Apr. 24, 2018

(54) ELECTRICITY-CHARGING SYSTEM BETWEEN A CRANE AND TRACTOR

(71) Applicant: Miyeon Kang, Seoul (KR)

(72) Inventor: Young Suk Ko, Busan (KR)

(73) Assignee: Miyeon Kang, Seoul (KR)

( * ) Notice: Subject to any disclaimer, the term of this patent is extended or adjusted under 35 U.S.C. 154(b) by 243 days.

(21) Appl. No.: 14/764,569

(22) PCT Filed: Jan. 28, 2014

(86) PCT No.: PCT/KR2014/000809
§ 371 (c)(1),
(2) Date: Jul. 29, 2015

(87) PCT Pub. No.: WO2014/119908
PCT Pub. Date: Aug. 7, 2014

(65) Prior Publication Data
US 2015/0367741 A1 Dec. 24, 2015

(30) Foreign Application Priority Data
Jan. 29, 2013 (KR) ........................ 10-2013-0009763

(51) Int. Cl.
*B60L 11/18* (2006.01)
*H02J 7/02* (2016.01)
(Continued)

(52) U.S. Cl.
CPC .......... *B60L 11/1811* (2013.01); *B60L 11/14* (2013.01); *B60L 11/182* (2013.01); *B60L 11/1803* (2013.01); *B60L 11/1818* (2013.01); *B60L 11/1861* (2013.01); *B66C 13/12* (2013.01); *H02J 7/025* (2013.01); *H02J 50/10* (2016.02);
(Continued)

(58) Field of Classification Search
None
See application file for complete search history.

(56) References Cited

U.S. PATENT DOCUMENTS

| | | | | |
|---|---|---|---|---|
| 2011/0101792 | A1* | 5/2011 | Koumoto | B60L 5/005 307/104 |
| 2012/0217819 | A1* | 8/2012 | Yamakawa | B60L 11/182 307/104 |
| 2012/0262002 | A1* | 10/2012 | Widmer | H04B 5/0037 307/104 |

FOREIGN PATENT DOCUMENTS

| | | |
|---|---|---|
| JP | 2009-023816 A | 2/2009 |
| JP | 2009-284656 A | 12/2009 |

(Continued)

OTHER PUBLICATIONS

International Search Report for PCT/KR2014/000809.
Written Opinion of the International Search Authority for PCT/KR2014/000809.

*Primary Examiner* — Jared Fureman
*Assistant Examiner* — Aqeel Bukhari
(74) *Attorney, Agent, or Firm* — The PL Law Group, PLLC

(57) ABSTRACT

Disclosed is a crane and a tractor used at a container base of a harbor or a container terminal, and more particularly, a charging system in which a power supplying device capable of supplying power in a contactless fashion is installed at the crane and a power collecting device capable of receiving power from the power supplying device is installed at the tractor, so that the tractor receives power from the power supplying unit installed at the crane while performing lifting or landing works below the crane to charge power required for movement of the tractor.

6 Claims, 10 Drawing Sheets

(51) Int. Cl.
*H02J 50/40* (2016.01)
*B60L 11/14* (2006.01)
*H02J 50/10* (2016.01)
*B66C 13/12* (2006.01)

(52) U.S. Cl.
CPC ........... *H02J 50/40* (2016.02); *B60L 2200/36* (2013.01); *B60L 2210/10* (2013.01); *B60L 2210/40* (2013.01); *Y02T 10/70* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 10/7216* (2013.01); *Y02T 10/7241* (2013.01); *Y02T 90/122* (2013.01); *Y02T 90/127* (2013.01); *Y02T 90/14* (2013.01)

(56) References Cited

FOREIGN PATENT DOCUMENTS

| | | |
|---|---|---|
| JP | 2011-006228 A | 1/2011 |
| KR | 10-2011-0084082 A | 7/2011 |
| KR | 10-1058644 B1 | 8/2011 |

* cited by examiner

US 9,950,631 B2

ELECTRICITY-CHARGING SYSTEM BETWEEN A CRANE AND TRACTOR

TECHNICAL FIELD

The present disclosure relates to a yard tractor which is container transport equipment used at a container terminal, and more particularly, to a system for charging a battery in a contactless power transmission fashion while a tractor operating at a container terminal stands by near a crane for a long time in order to lift or land a container, under the condition that existing tractors using a diesel fuel are being substituted with electric tractors due to environmental pollution and such an electric tractor should stop for recharging without performing works if its battery is entirely discharged.

The present application claims the benefit of Korean Patent Application No. 10-2013-0009763 filed on Jan. 29, 2013 with the Korean Intellectual Property Office, the disclosure of which is incorporated herein by reference in its entirety.

BACKGROUND ART

A container terminal provided at a land of a harbor for loading or unloading of a container is a base for marine transportation by ships and land transportation by trucks, trains or the like, and berth facilities for ships (container ships), container loading and unloading facilities, container storage facilities and so on are organically constructed therein to facilitate smooth container distribution. Also, the container terminal is organically connected to a land transportation network including loads and railways.

In order to distribute containers without congestion at a harbor, a system for efficiently managing the entire container terminal is required, and also it is important to procure sufficient relevant facilities such as berth facilities for ships (container ships), container landing and carrying facilities, container storage facilities and so on.

In relation to landing/lifting of containers, a gantry crane installed at a container terminal or the like is a crane for a harbor, which has a door or bridge shape, and is used for stacking containers carried by yard tractors or yard trailers (hereinafter, generally referred to as tractors) or loading stacked containers on yard tractors.

FIG. 1 is a diagram schematically showing an appearance of a container terminal. In the container terminal as shown in FIG. 1, if a cargo ship 1000 having a container cargo reaches a harbor, a container is primarily landed by a container crane 2000 installed at the harbor, the landed container is loaded on a yard tractor and carried to a yard storage area, and the moved container is stored by a gantry crane 3000.

On the contrary, s container carried by a yard tractor may also be shipped on the cargo ship 1000 substantially in the same way, in a reversed order.

A yard tractor tows a yard chassis in a container terminal to transport a container between a dock and a container yard. Here, the yard tractor runs a low speed of about 40 km/hr ad uses a high-output engine ensuring high acceleration since it should reach a certain speed within a short time for the purpose of landing works.

As shown in FIG. 1, the yard tractor just moves in container stacking areas A, B, C and D of FIG. 1, due to its special use in the container yard. From the fact that a yard tractor moves only within a predetermined loading area or along a predetermined path, the inventors of the present disclosure have understood that if energy for operating a vehicle can be obtained in each workspace, all problems of a yard tractor of hybrid method which uses a mixture of fossil fuel and electric fuel and a yard tractor of a battery method which operates with a large-capacity battery can be solved together, and from the understanding, the inventors of the present disclosure have proposed Korean Patent Application No. 2010-0117280 (entitled "Tired gantry crane and straddle carrier for receiving power in contactless fashion") disclosing a yard tractor which receives power from a power supplying unit capable of supplying power in a contactless fashion in a container stacking area or a tractor moving path and its control method.

However, a yard tractor operating at a harbor periodically reciprocates between a quay crane for landing or lifting a container at a ship and a yard crane for stacking a container. However, since lifting and landing points are not fixed, it requires a lot of costs to install a power supplying device over the entire working area. In addition, if a power supplying place is separately designated for charging a battery of a yard tractor, the yard tractor should stop at the designated place for a certain time for charging, which deteriorates work efficiency.

SUMMARY

The present disclosure is designed to solve the problems of the related art, and therefore the present disclosure is directed to providing a charging system, which includes a crane having a power supplying device for supplying power in a contactless fashion and a tractor having a power collecting device for receiving power in a contactless fashion, whereby it is not needed to install a power supplying device over the entire working area and also it is possible to save time required for a tractor to stop at a designated place for a certain time for charging.

In one aspect of the present disclosure, there is provided a charging system between a crane and a tractor, wherein the crane includes a power supplying unit, wherein the tractor includes a power collecting unit for receiving power from the power supplying unit, wherein the power collecting unit includes a power collecting pick-up unit having a power collecting core and a power collecting coil and a power collection driving unit for converting current generated by the power collecting pick-up unit into useable power, and wherein the power collecting pick-up unit of the tractor generates an induced current by responding to a magnetic field change from the power supplying unit of the crane, and the power collection driving unit converts the induced current generated by the power collecting pick-up unit into useable power and supplies the power into a load.

The power collection driving unit of the power collecting unit may further include a regulator connected to the power collecting pick-up unit, and the regulator may convert the induced current generated by the power collecting pick-up unit into a DC power.

In addition, the power collection driving unit of the power collecting unit may further include a power conversion unit configured to match the DC power obtained from the regulator with an operation voltage of a motor serving as a load, and when the motor is a three-phase alternate current motor using an alternate current, the power conversion unit may be an inverter for converting DC power into AC power.

Moreover, the charging system may further include a rechargeable battery provided between the power conversion unit and the regulator, and the rechargeable battery may be charged with the power supplied from the regulator. In addition, an AC input terminal may be further provided at the regulator to receive external AC power, and the rechargeable battery of the power collecting unit may be charged with any one of the AC power input from the AC input terminal and the induced current input by the power collecting pick-up unit.

According to the present disclosure, since a charging system includes a crane having a power supplying device for supplying power in a contactless fashion and a tractor having a power collecting device for receiving power in a contactless fashion, it is not needed to install a power supplying device over the entire working area, and also it is possible to save time required for a tractor to stop at a designated place for a certain time for charging.

| [Reference Symbol] | |
|---|---|
| 100: crane | 110: trolley |
| 120: guide rail | 130: spreader |
| 140: body unit | 141: upper frame |
| 142: support frame | 150a: first wheel |
| 150b: second wheel | 151a, 151b: tire wheel |
| 152a, 152b: fork | 153a, 153b: connection frame |
| 161a, 161b: first laser scanner | 162a, 162b: second laser scanner |
| 190, 190': power supplying unit | 200: yard tractor |
| 210, 210': power collecting unit | 211: power collection driving unit |
| 211a: regulator | 211b: rechargeable battery |
| 211c: battery management system | 211d: DC-DC converter |
| 211e: power conversion unit | 211f: electronic device |
| 212: motor | 213, 213': pick-up unit |
| 213a: power collecting coil | 213b: power collecting core |
| 221: wheel | 222: rail |
| 223: power supply driving controller | 224: cable reel |
| 225: wire cable | 226: hydraulic cylinder |

DETAILED DESCRIPTION

It should be understood that the terms used in the present disclosure are not intended to limit the present disclosure but used for explain specific embodiments, and a singular expression should be interpreted as including a plural meaning, unless stated otherwise. Several embodiments may be proposed in the present disclosure, and any features overlapped with each other may be not described in duplication.

Hereinafter, preferred embodiments of the present disclosure will be described in detail with reference to the accompanying drawings so that they can be easily implemented by those skilled in the art.

Figure 1:
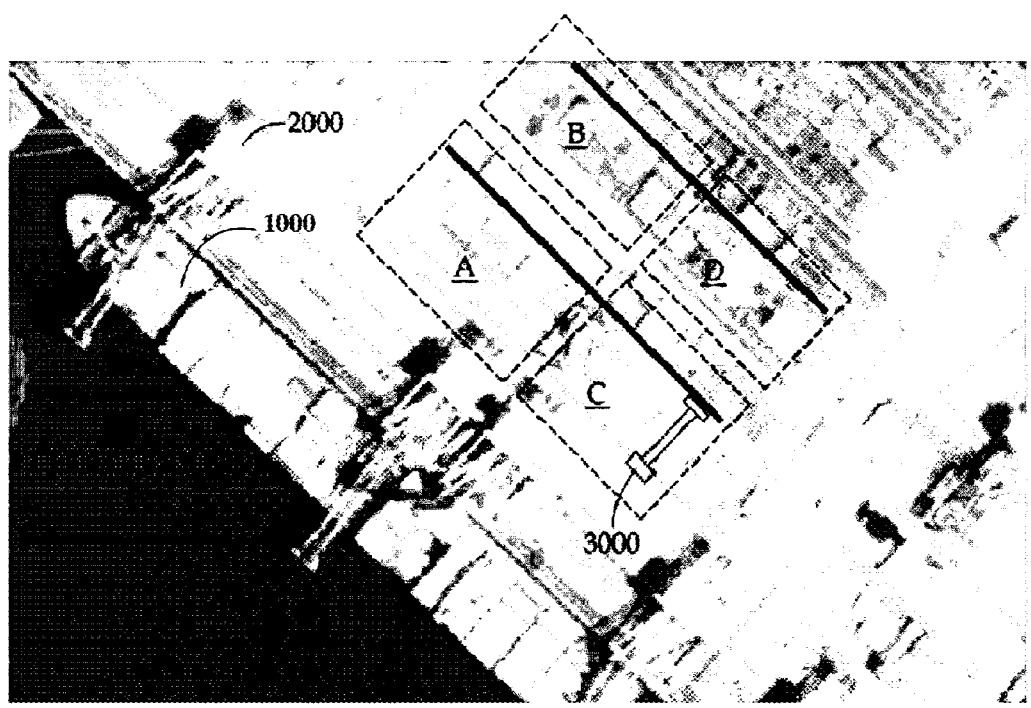
FIG. 1 is a diagram schematically showing a structure of a container terminal system provided at a harbor.
Figure 2A:
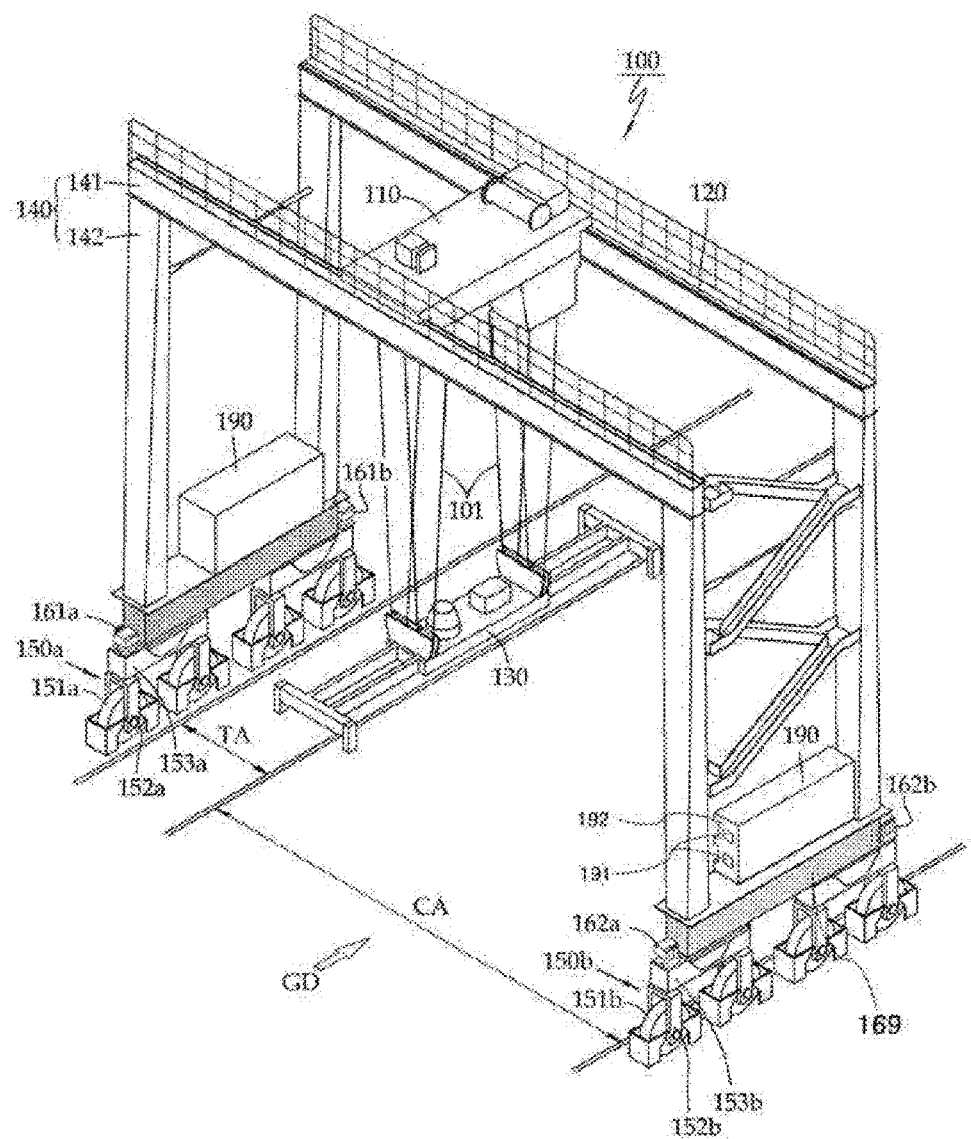
FIG. 2a is a diagram schematically showing an appearance of a gantry crane for a harbor according to the present disclosure.

FIG. 2a is a perspective view showing a tired gantry crane according to an embodiment of the present disclosure. Referring to FIG. 2a, the tired gantry crane according to an embodiment of the present disclosure includes a crane 100. However, the present disclosure is not limited to the crane structure depicted in FIG. 2a, and any gantry crane of various structures may be included in the present disclosure.

The crane 100 includes a trolley 110, a spreader 130, a body unit 140 and wheels 150a, 150b. Hereinafter, for convenience, the wheel 150a installed at a left side of the crane 100 will be called a first wheel, and the wheel 150b installed at a right side will be called a second wheel.

The trolley 110 is installed to move in a length direction (a horizontal direction) of an upper frame 141 of the crane 100 along a guide rail 120 installed at the upper frame 141. A spreader 130 is connected to the trolley 110 toward the ground, namely in a vertical direction, by means of a rope 101.

The spreader 130 is connected to the trolley 110 through the rope 101 as described above and moves in a length direction of the upper frame 141 in association with the trolley 110. In addition, the spreader 130 moves vertically by means of upward or downward movement of the rope 101 connected to the trolley 110.

The body unit 140 forms a framework of the crane 100 and includes an upper frame 141 and a support frame 142. The guide rail 120 is installed at the upper frame 141. The upper frame 141 may be integrally installed with the support frame 142 installed vertically or may be integrated thereto by using a coupling member.

The first and second wheels 150a, 150b are running devices respectively installed at both sides, namely right and left sides, of the crane 100 to move the crane 100 in a running direction, and includes a plurality of tire wheels 151a, 151b, forks 152a, 152b for gripping the tire wheels 151a, 151b, and connection frames 153a, 153b. The connection frames 153a, 153b connect the forks 152a, 152b to the support frame 142 of the body unit 140 and may be formed to have a plate structure with a flat upper surface.

A tire gantry crane according to the present disclosure includes a power supplying unit 190 for supplying power in a contactless fashion to transport equipment such as a tractor which stops near the tired gantry crane to perform lifting or landing works. In this embodiment, as shown in FIG. 2a, the power supplying unit 190 is illustrated as being installed on a side frame 169 at a leg of the crane, but the present disclosure is not limited thereto, and the power supplying unit 190 may extend from the upper portion of the crane to a certain height. In addition, a power supplying cable may be installed at the side frame 169 of the gantry crane as indicated by a reference symbol 169 in FIG. 2a, and the power supplying unit 190 may also be installed at another portion.

Figure 2B:
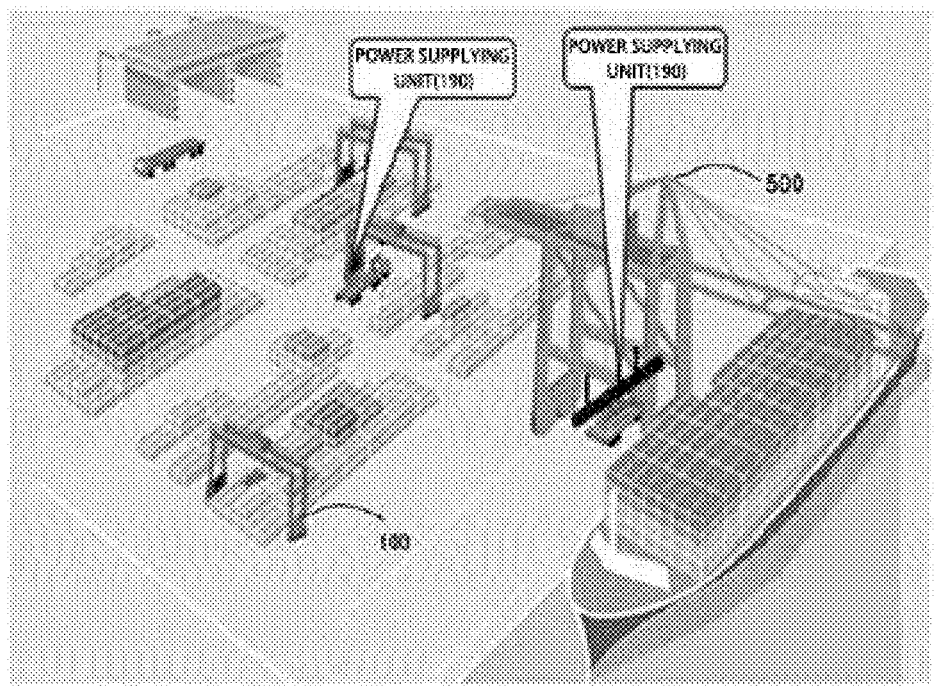
FIG. 2b shows an example of a power supplying unit installed according to the present disclosure.

FIG. 2b schematically shows a container terminal provided on the land of a harbor. As shown in FIG. 2b, the power supplying unit 190 according to the present disclosure may be installed at a quay crane or trolley crane 500 for primarily landing or lifting loads from a ship in a quay area of the harbor. In this case, the power supplying unit 190 may be installed to extend downwards from the side frame of the quay crane 500 or the upper portion of the crane. In addition, the power supplying unit 190 according to the present disclosure may be further installed at a gantry crane 100 which is a yard crane for lifting or landing a container to/from a tractor in a yard area. In the figure, the power supplying unit 190 is illustrated as being installed at the side frame of the gantry crane 100, but the present disclosure is not limited thereto, and the power supplying unit 190 may be installed at another appropriate place.

Figure 5:
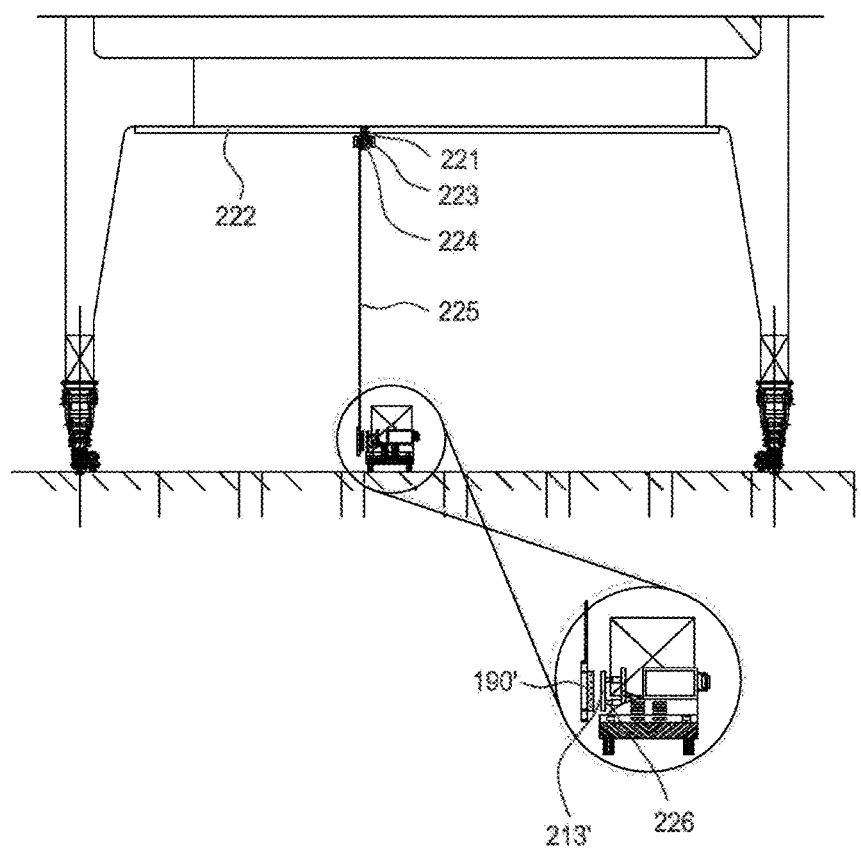
FIG. 5 is a front view schematically showing a power supplying unit and a power collecting unit according to another embodiment of the present disclosure.

For example, referring to FIGS. 2a and 5, a power supplying unit 190' according to another embodiment of the present disclosure may be provided to ascend or descend at an upper frame 141, a trolley 110 or a support frame 142 of the gantry crane 100.

Figure 6:
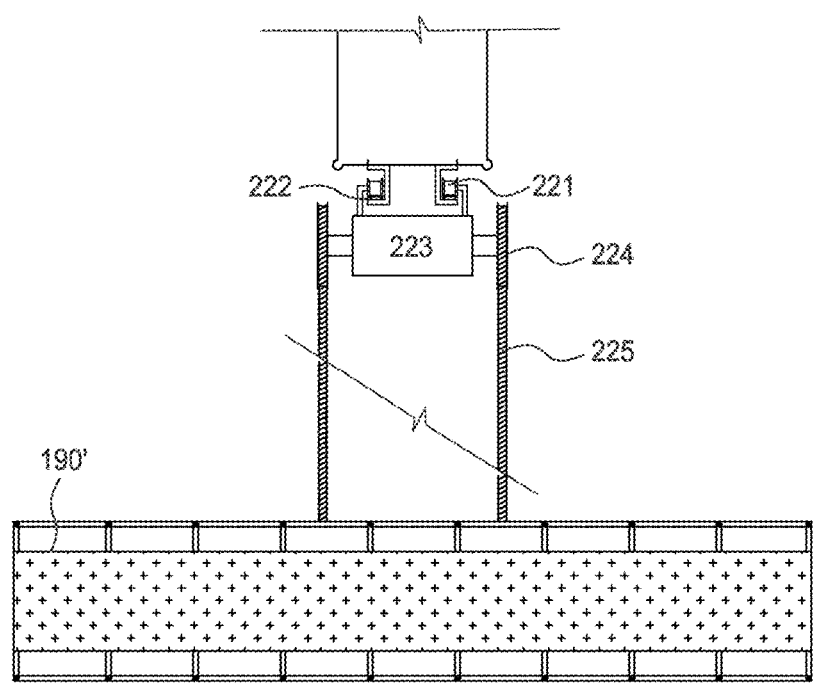
FIG. 6 is a side view schematically showing the power supplying unit of FIG. 5.

Referring to FIG. 6, if the power supplying unit 190' is installed at a lower end of the upper frame 141, a rail 222 is provided at a lower portion of the upper frame 141, and a wheel 221 may move right and left through the rail 222 in a length direction of the upper frame 141.

A wire cable 225 wound around a cable reel 224 may move upwards or downwards by means of a power supply driving controller 223 connected to a lower portion of the wheel 221 and the cable reel 224, and the power supplying unit 190' may be provided at a terminal of the wire cable 225.

The power supply driving controller 223 may control movement of the wheel 221 or ascending or descending movement of the wire cable 225.

In the above configuration, a stop position of the power supplying unit 190' is accurately determined during 20-feet or 40-feet container works. For this reason, by positioning a power supplying line at an optimal location for each work, it is possible to minimize installation of the power supplying line. Also, since the tractor also stops and is in a stand-by state, the power collecting device may be moved as close to the power supplying device as possible, which may maximize the power transmission efficiency.

The power supplying unit 190' as described above may be formed at a lower portion of the trolley 110 and may also be fixed to an inner side (or, both sides) of the support frame 142 without using any wheel or rail.

Corresponding to the configuration of the power supplying unit 190' according to this embodiment of the present disclosure, the tractor 200 may also have a power collecting unit 210' of a different configuration.

As shown in FIG. 5, the power collecting unit 210' provided at one inner side (or, both sides) of the tractor 200 may include an approach distance adjusting unit such as a hydraulic cylinder 226 so that a pick-up unit 213' approaches the power supplying unit 190' further when receiving power. The pick-up unit 213' may be restored to its original location by the hydraulic cylinder 226 when not receiving power.

Therefore, the power collecting unit 210' may enhance power receiving efficiency from the power supplying unit 190' by suitable adjustment of the approach distance adjusting unit.

In addition, the supply of power in a contactless fashion means that power is supplied by means of electromagnetic induction between a power collecting unit and a power supplying unit disposed to face the power collecting unit. The power supplying unit 190 is generally configured to perform charging by means of electromagnetic induction and generally includes a power supplying cable (a power line).

Figure 2C:
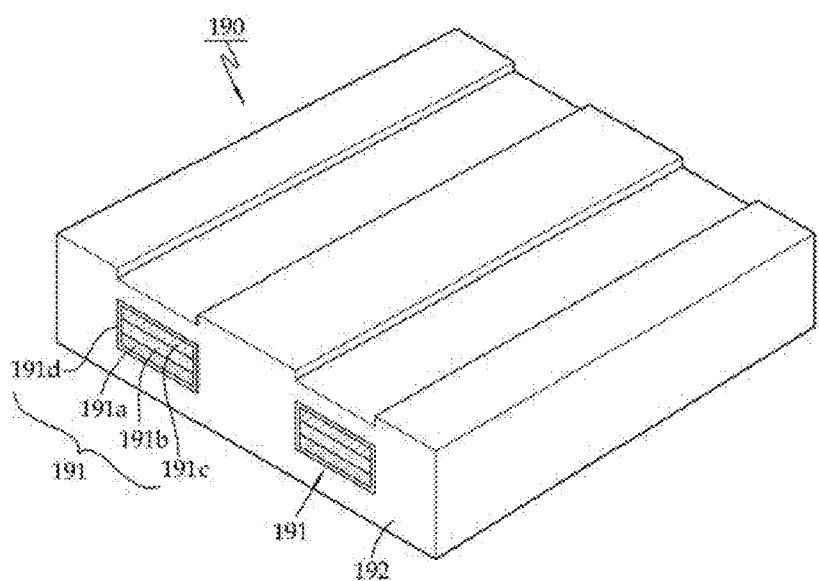
FIG. 2c is a diagram schematically showing a power supplying unit according to the present disclosure.

FIG. 2c shows an example of the power supplying unit 190. As shown in FIG. 2c, the power supplying unit 190 includes a power supplying coil track 191 in which a film-type power supplying core 191a, an insulator 191b and a power supplying cable (a power supplying line or a power cable) 191c are laminated and accommodated in an inner housing 191d, and an outer housing 192 disposed out of the power supplying coil track 191 to serve as a protection member for protecting the power supplying coil track 191. The power supplying core 191a is laminated as an amorphous or silicon steel plate, and the power supplying cable 191c is laminated as a copper plate. The insulator 191b electrically isolates the power supplying core 191a from the power supplying cable 191c, and the inner housing 191d may be formed by means of molding or extrusion-molding. In addition, the outer housing may be made of reinforced plastic or bakelite. In particular, when a plurality of power supplying coil tracks 191 are provided, there may be provided in parallel at regular intervals.

Also, though not shown in the figures, the power supplying unit 190 may include an external power input unit for receiving power from the outside and supplying the power to the power supplying cable 191c of power supplying unit 190. If the crane receives power from the outside, the supplied power may be partially introduced to the power supplying unit.

In addition, in this embodiment, the power supplying unit 190 is formed at a side of the crane so as not to disturb movement of a tractor which moves through the crane.

Figure 3:
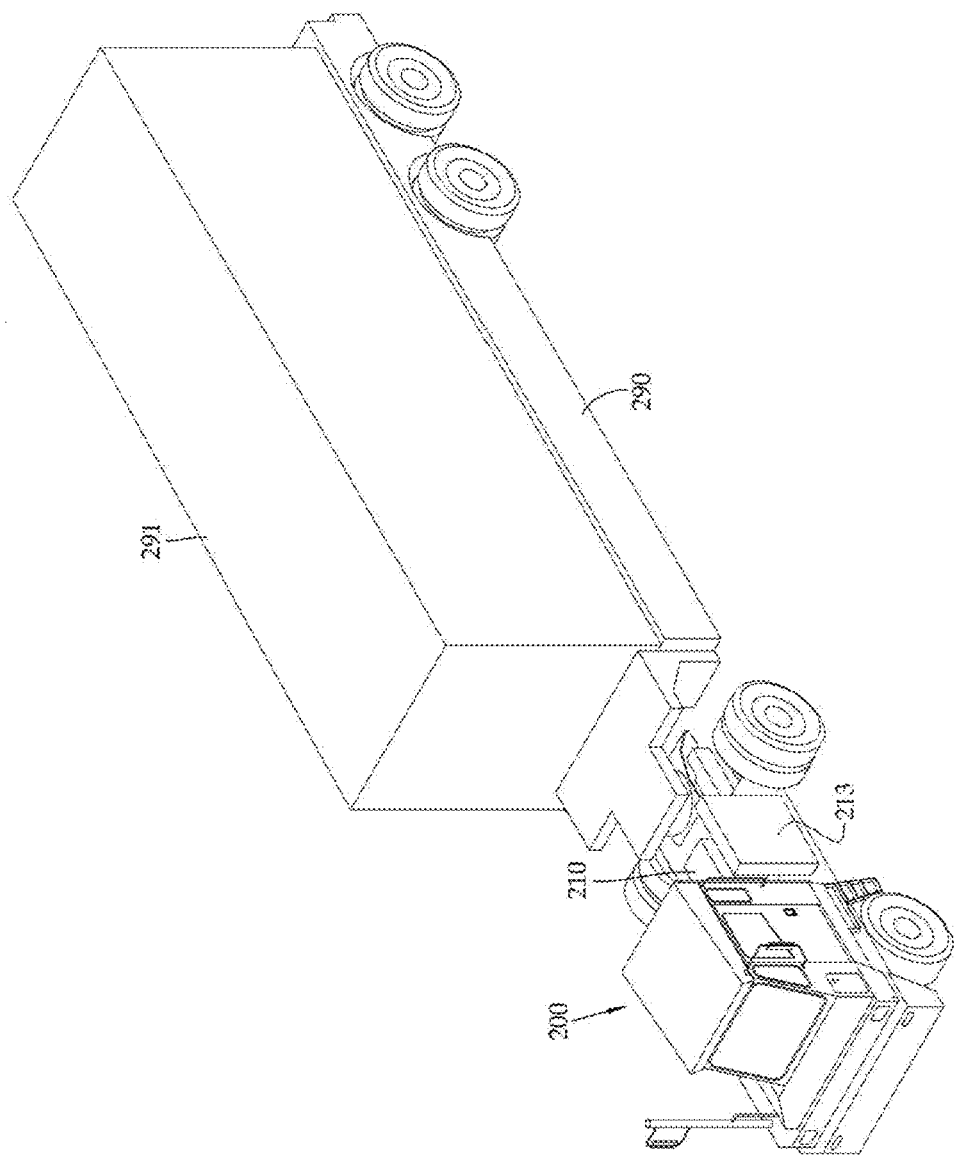
FIG. 3 is a diagram schematically showing an appearance of a yard tractor for a harbor according to the present disclosure.

FIG. 3 is a diagram showing a general yard tractor. Referring to FIG. 3, a tractor according to an embodiment the present disclosure has a general tractor shape. In FIG. 3, a yard chassis or yard trailer 290 is coupled to the yard tractor 200, a container 291 is loaded on the yard chassis or yard trailer 290, or a container 291 is unloaded from the yard chassis or yard trailer 290.

The yard tractor according to the present disclosure, designated with a reference symbol 200 in FIG. 3, uses a contactless power supply method in order to solve high maintenance costs of existing hybrid engines, great installation costs of high-capacity batteries of electric motors, and long standby time required for recharging at a fixed location.

The contactless power supply method means that power is supplied in a contactless fashion by means of electromagnetic induction between a power collecting unit and a power supplying unit disposed to face the power collecting unit, and in the present disclosure, in order to use the contactless power supply method, the power supplying unit 190 is installed at the crane, and the power collecting unit 210 is installed at the tractor to receive power from the power supplying unit 190 of the crane.

As shown in FIG. 3, the yard tractor 200 according to the present disclosure includes a power collecting unit 210 provided at a side frame of the tractor, and the power collecting unit 210 includes a pick-up unit 213 and a power-collecting driving unit 211. Hereinafter, the configuration of the power collecting unit 210 will be described with reference to FIG. 4a.

Figure 4A:
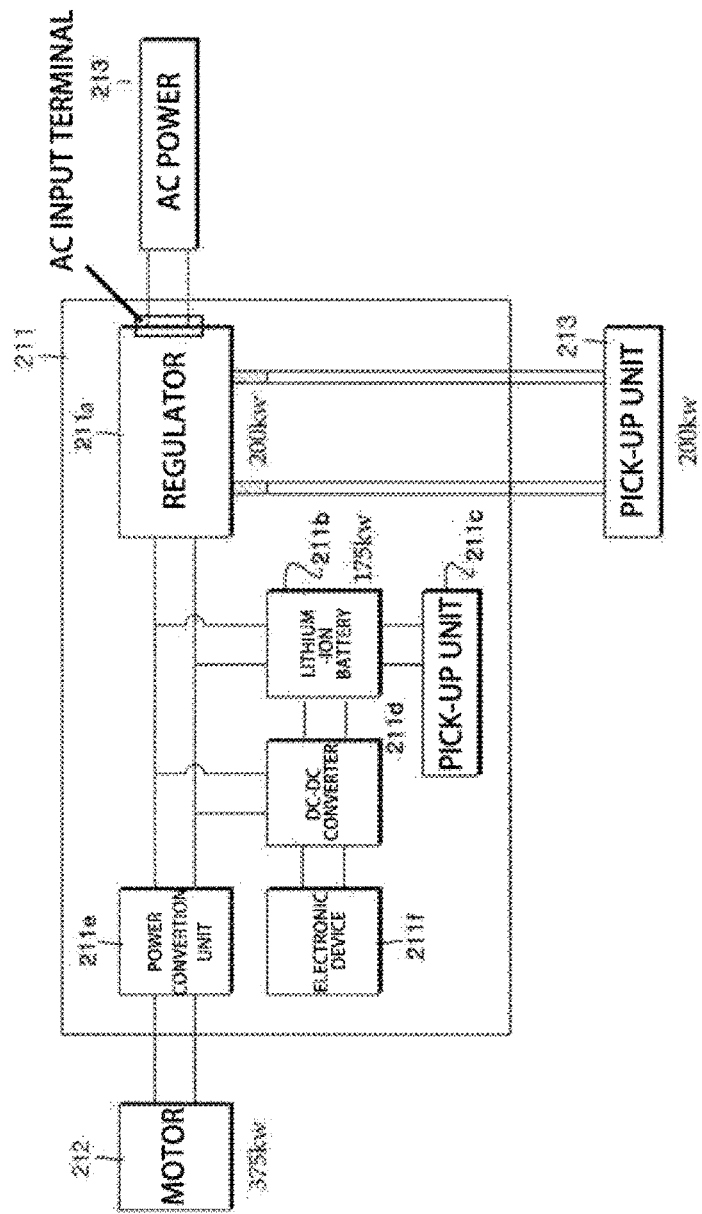
FIG. 4a is a block diagram schematically showing a power collection driving unit of a power collecting unit employed at a yard tractor according to the present disclosure.

FIG. 4a is a circuitry block diagram schematically showing the power collecting unit 210 installed at the yard tractor 200 according to the present disclosure. As shown in FIG. 4a, the power collecting unit 210 includes a pick-up unit (or, a load dispatching board) 213 for responding to a magnetic change from the power supply unit 190 and a power-collecting driving unit 211 for stably supplying the induced power obtained from the pick-up unit to a motor 212 serving as a load.

Figure 4B:
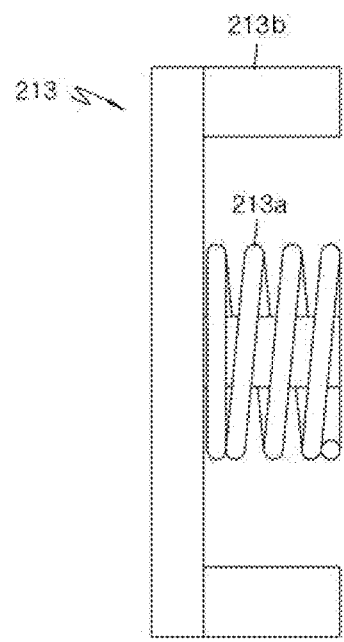
FIG. 4b is a diagram schematically showing a pick-up unit of the power collecting unit according to the present disclosure.

FIG. 4b is a diagram showing the pick-up unit 213 of the power collecting unit 210, and the pick-up unit includes a power collecting coil 213a installed at a core 213b. The power collecting coil 213a is configured to allow an induced current to flow by means of magnetic field induction if power is supplied from the power collecting coil 190.

In the present disclosure, the yard tractor 200 is configured to receive power from the power supplying unit 190 installed at the crane 100 by means of magnetic field induction and charges its battery when it stops at the crane 100 for lifting or landing works. For this, in an embodiment of the present disclosure, the pick-up unit 213 of the power collecting unit 210 is provided at the side frame of the yard tractor.

Figure 4C:
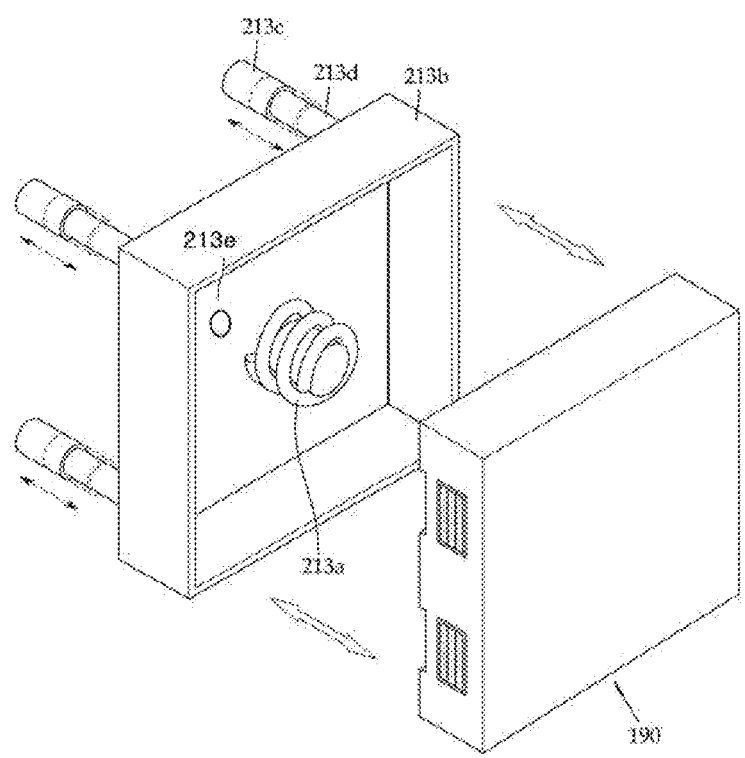
FIG. 4c is a diagram schematically showing a movement of location between the power collecting unit and power supplying unit according to the present disclosure.

FIG. 4c is a diagram schematically showing a location movement relation between the power supplying unit 190 and the pick-up unit 213 of the present disclosure. Generally, when power is supplied by means of magnetic induction through the pick-up unit 213 of the power collecting unit 210, if the distance between the pick-up unit 213 and the power supply unit 190 is small, the power supply efficiency is greatly improved.

In order to adjust a distance between the pick-up unit 213 and the power supplying unit 190, in an embodiment of the present disclosure, the pick-up unit 213 may also be configured to further include moving units 213c, 213d which may move the pick-up unit 213 toward the power supplying unit 190 so as to be disposed near the power supplying unit 190 provided at the side of the crane. The moving units 213c, 213d have a plurality of insert tubes, and when the tractor is moving, a first arm structure 213d is inserted into and accommodated in a second arm structure 213c, and when the tractor receives power from the power supplying unit 190, the first arm structure 213d accommodated in the second arm structure 213c protrudes out.

The piston insertion/protrusion motion of the first arm structure 213d in the second arm structure 213c is performed by moving the using first arm structure 213d by means of a hydraulic cylinder method or by connecting a hydraulic adjustment unit such as a hydraulic pump, a hydraulic motor or a hydraulic valve to the inner end of the first arm structure 213d (the end inserted into the second arm structure) and controlling the pressure of the hydraulic adjustment unit.

In addition, the pick-up unit 213 according to the present disclosure may further include a proximity sensor 213e in order to prevent the pick-up unit 213 from colliding with the power supplying unit 190. The proximity sensor 213e is a sensor for sensing an approaching article in a contactless fashion, and a photoelectric proximity sensor using a light source or a proximity sensor using an optical fiber may be used as the proximity sensor.

Alternatively, when the pick-up unit 213 approaches the power supplying unit 190, an amount of generated induced current gradually increases. By using this principle, a current detector or galvanoscope (not shown) may be installed to the pick-up unit 213 to measure an amount of generated induced current, and then if the amount of generated current is greater than a reference value as the pick-up unit 213 approaches the power supplying unit 190, the approaching movement of the first arm structure 213d may be restricted or notified to a user.

Next, referring to FIG. 4a, the induced power obtained from the pick-up unit 213 cannot be provided for a general power device (a motor driving power source), in the present disclosure, a power-collecting driving unit 211 or a stabilizing unit 211 is provided to stabilize the induced power obtained from the pick-up unit 213.

The induced power obtained from the pick-up unit 211 is firstly converted into DC power through a regulator 211a and the DC power is supplied to a load through a power conversion unit 211e for adjusting the DC power as an operating voltage of a motor 212 serving as a load.

At this time, if the motor is a three-phase alternate current motor, the power conversion unit 211e may employ an inverter for converting DC power to AC power again, and if the motor is a DC motor, a chopper or the like may be used for controlling DC power. In other words, the power conversion unit 211e may be modified depending on conditions of a load used. In this embodiment, the motor 212 adopts a three-phase alternate current motor, and an inverter is used as the power conversion unit 211e.

In addition, as shown in FIG. 5, the stabilizing unit 211 of the power collecting unit 190 installed at the yard tractor 200 according to the present disclosure further includes a lithium-ion battery 211b between the power conversion unit 211e and the regulator 211a. The lithium-ion battery 211b is configured to be rechargeable and supplies power required for the motor 212 together with the regulator 211a.

As described above, the charging capacity of the battery should be selected in consideration of efficiency and economic feasibility. In the present disclosure, the yard tractor 200 moving in a certain working area of a container station may adopt a relatively smaller-capacity battery, because the battery is configured to receive power from the power supply unit 190 during the landing or lifting works of the yard tractor 200.

In addition, the yard tractor 200 according to the present disclosure may maintain the battery 211b not to drop its voltage below a predetermined level and also include a battery management system (BMS) circuit 211c for preventing the battery 211b from being overcharged over a predetermined level, thereby stably maintaining the lithium-ion battery 211b.

In addition, the stabilizing unit 411 of the power collecting unit 210 installed at the yard tractor 200 according to the present disclosure may further include a DC-DC converter between the battery 211b and the power conversion unit 211e so that power may be stably supplied to an electronic device 211f required for the yard tractor 200 in addition to the motor 212, for example a control panel required for controlling the yard tractor.

In addition, in the stabilizing unit 211 of the power collecting unit 210 employed at the yard tractor 200 according to the present disclosure, an AC input terminal may be further installed at the regulator 211a to directly receive power from the AC power 213, not in a contactless fashion. If the AC input terminal is further installed, at an emergency, for example when the battery is fully discharged while the yard tractor 200 is moving, the yard tractor 200 may receive power from an adjacent AC power station to charge the battery.

As described above, the yard tractor 200 according to the present disclosure may reduce maintenance costs in comparison to existing hybrid-type yard tractors by adopting the contactless power transmission method using electromagnetic induction, and may also reduce early-stage installation costs by using a relatively smaller-capacity battery in comparison to an electrically-charging yard tractor using an expensive large-capacity battery. In addition, it is not required to install the power supplying device over the entire working area, and the time required for the yard tractor to stop at a designated place for a certain time for charging may be saved.

The above description is just an example to show the technical features of the present disclosure, and it is obvious to those skilled in the art that various changes and modifications can be made without departing from the essence of the present disclosure. Therefore, embodiments of the present disclosure are not intended to limit the scope of the present disclosure but for better understanding, and the scope of the present disclosure is not limited by the embodiments.

Even though it has been illustrated that the power supplying unit is installed at a tired gantry crane as an example, the present disclosure is not limited thereto, and the power supplying unit may be installed at a trolley crane used in a cargo handling area of a harbor or a rail-type crane installed on a rail of a working area of a harbor.

In addition, even though it has been illustrated that the power supplying unit is installed at both sides of the tired gantry crane, the present disclosure is not limited thereto, and the power supplying unit may be installed only at one side of the tired gantry crane.

Moreover, even though it has been illustrated that the power collecting unit is installed at a yard tractor as a transportation unit, the present disclosure is not limited thereto, and the power collecting unit may be installed to any transportation unit or moving unit which is useable for lifting or landing works, as obvious to those skilled in the art.

Therefore, the scope of the present disclosure should be defined by the appended claims, and all technical features belonging thereto or equivalent thereto should be interpreted as falling within the scope of the present disclosure.

What is claimed is:

1. A charging system, comprising:
    a crane including a power supplying unit;
    a tractor including a power collecting unit for receiving power from the power supplying unit, the power collecting unit comprising a power collecting pick-up unit having a power collecting core and a power collecting coil and a power collection driving unit for converting current generated by the power collecting pick-up unit into useable power; wherein the power collecting pick-up unit of the tractor generates an induced current by responding to a magnetic field change from the power supplying unit of the crane, and the power collection driving unit converts the induced current generated by the power collecting pick-up unit into useable power and supplies the power into a load.

2. The charging system according to claim 1,
    wherein the power collection driving unit of the power collecting unit further includes a regulator connected to the power collecting pick-up unit, and
    wherein the regulator converts the induced current generated by the power collecting pick-up unit into a DC power.

3. The charging system according to claim 2,
    wherein the power collection driving unit of the power collecting unit further includes a power conversion unit configured to match the DC power obtained from the regulator with an operation voltage of a motor serving as a load.

4. The charging system according to claim 3,
    wherein when the motor is a three-phase alternate current motor using an alternate current, the power conversion unit is an inverter for converting DC power into AC power.

5. The charging system according to claim 3, further comprising:
    a rechargeable battery provided between the power conversion unit and the regulator,
    wherein the rechargeable battery is charged with the power supplied from the regulator.

6. The charging system according to claim 5, wherein an AC input terminal is further provided at the regulator to receive external AC power, and the rechargeable battery of the power collecting unit is charged with any one of the AC power input from the AC input terminal and the induced current input by the power collecting pick-up unit.

* * * * *